Jan. 2, 1923.
T. RANKIN.
AUTOMATIC PIPE CUTTING MACHINE.
FILED OCT. 28, 1921.
1,440,492.
4 SHEETS—SHEET 1.
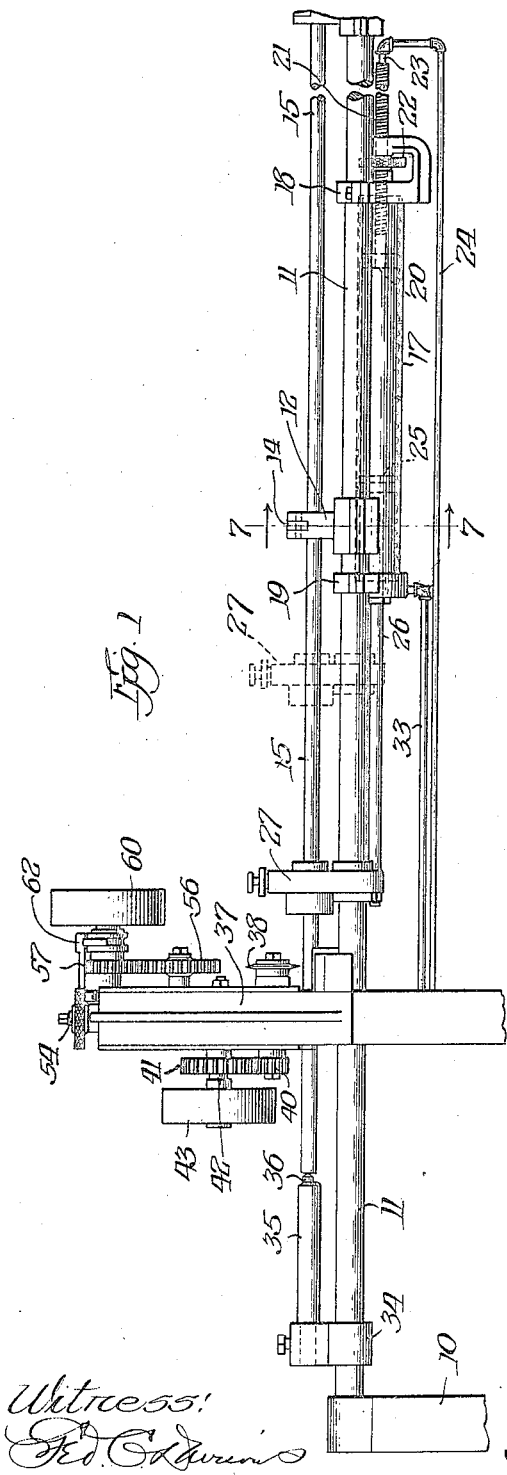
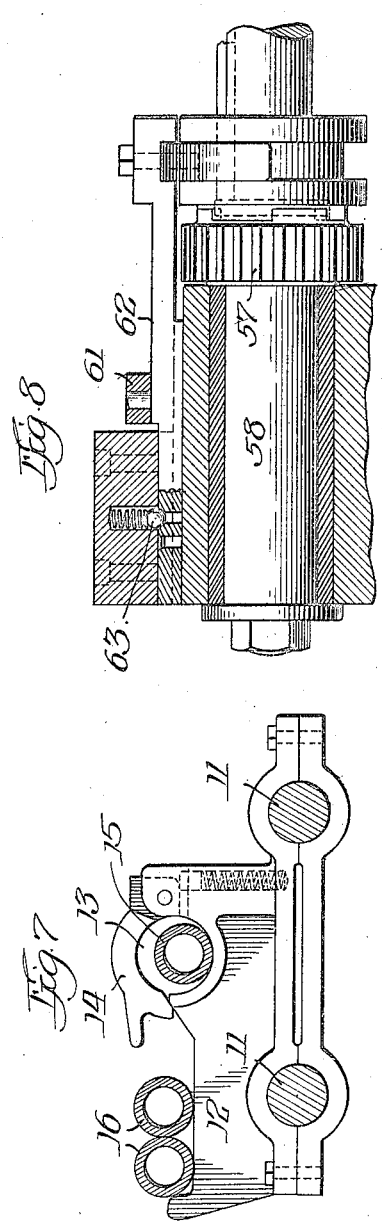

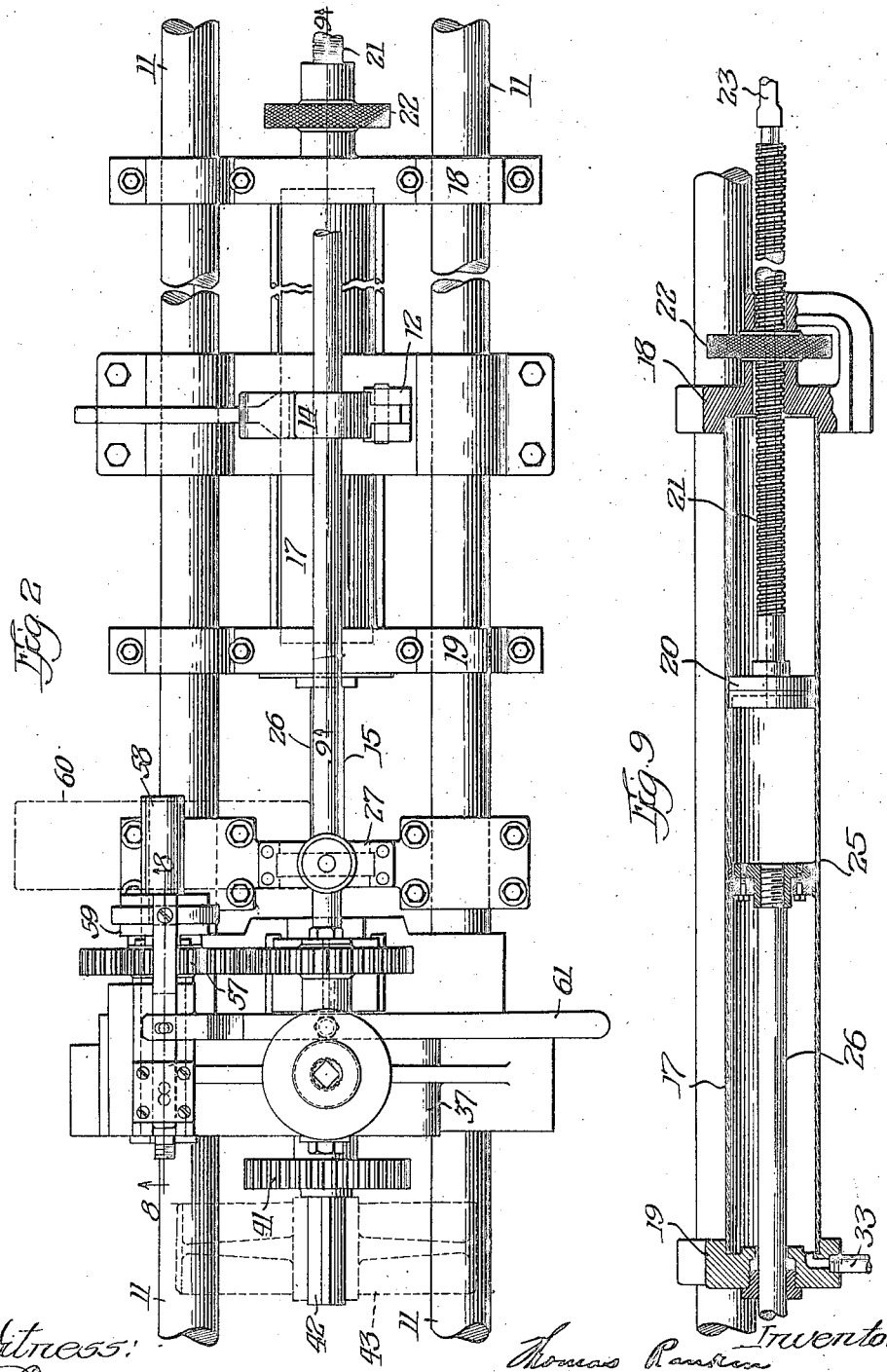

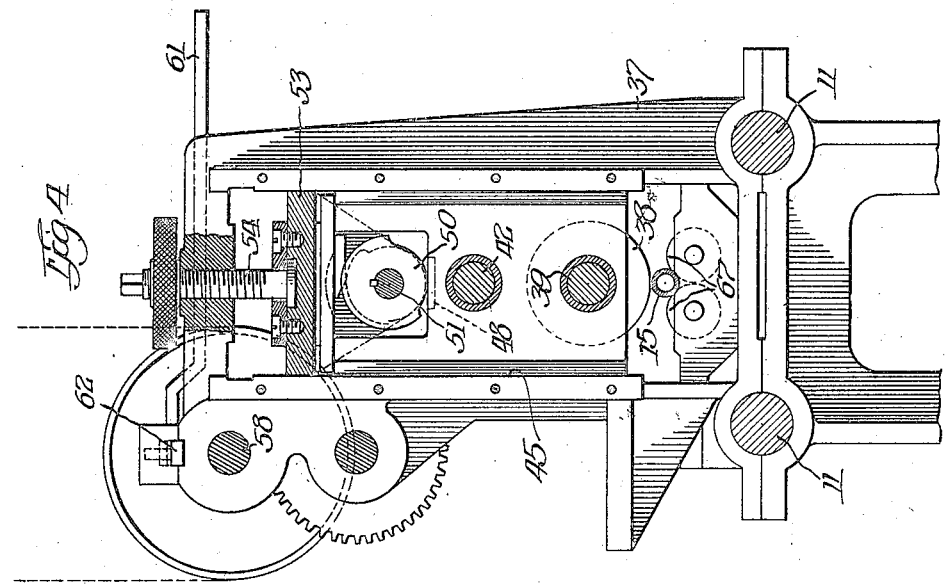
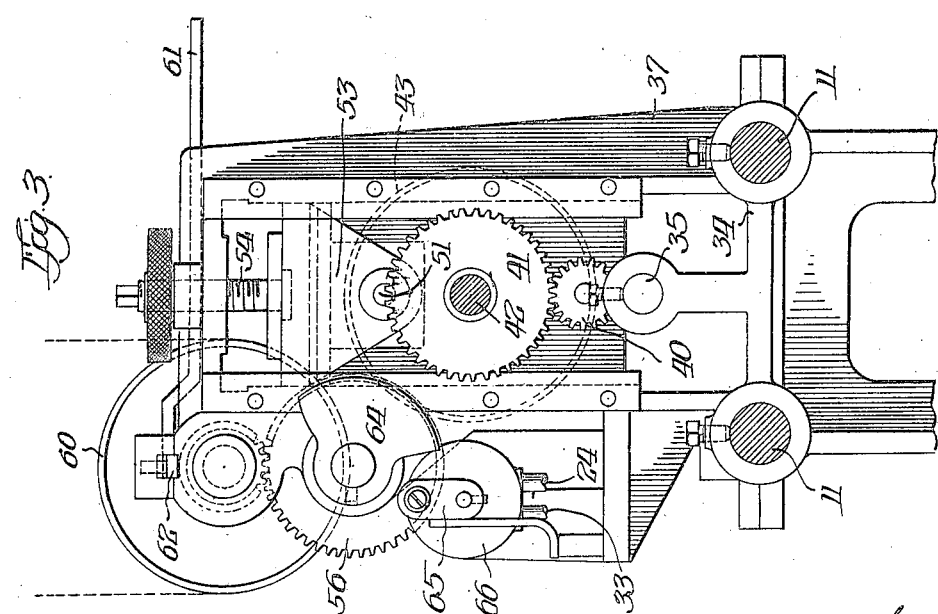

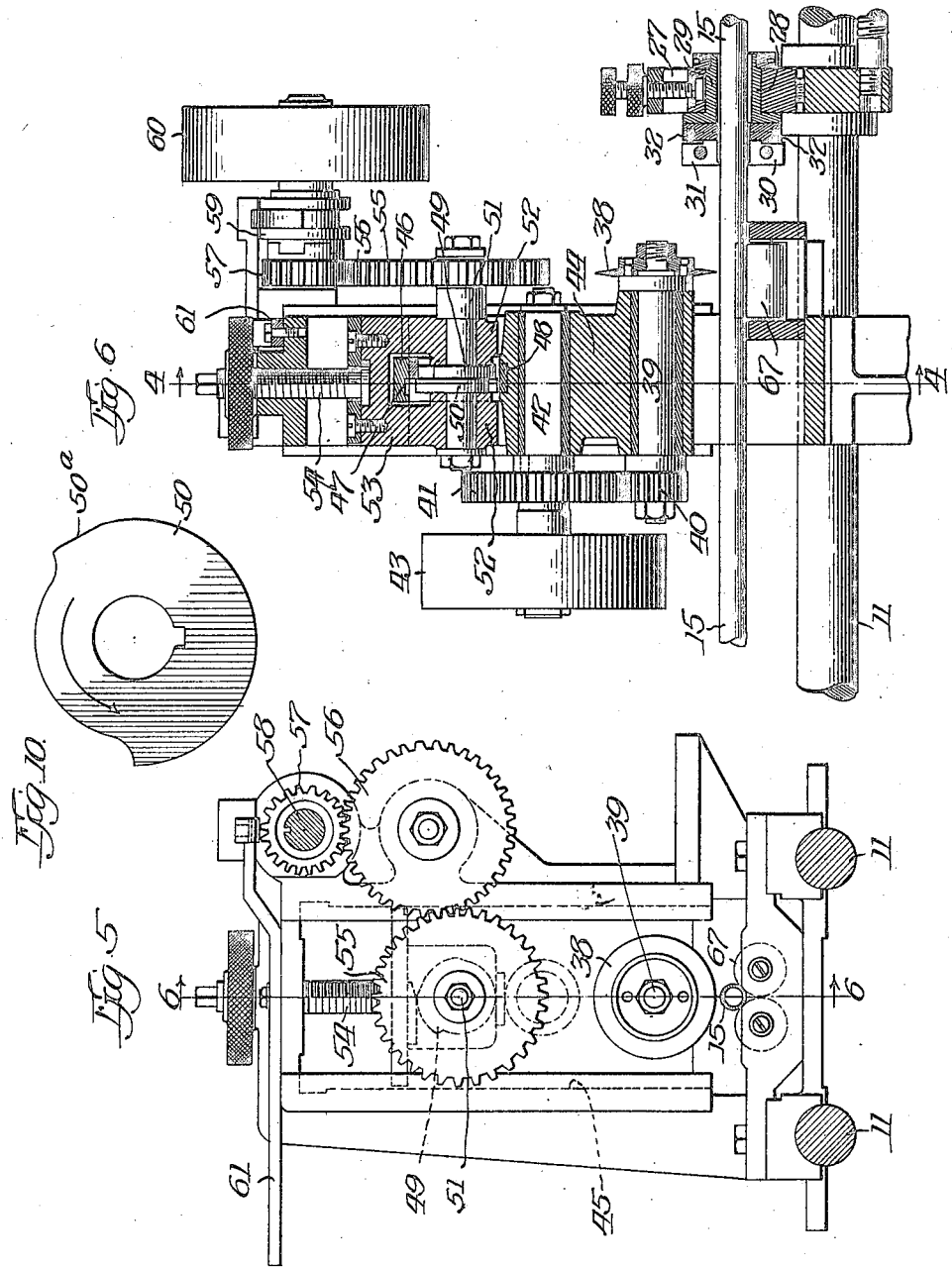

Patented Jan. 2, 1923.

1,440,492

UNITED STATES PATENT OFFICE.

THOMAS RANKIN, OF LAKE BLUFF, ILLINOIS.

AUTOMATIC PIPE-CUTTING MACHINE.

Application filed October 23, 1921. Serial No. 511,113.

*To all whom it may concern:*

Be it known that I, THOMAS RANKIN, a citizen of the United States, and resident of Lake Bluff, in the county of Lake and State of Illinois, have invented certain new and useful Improvements in an Automatic Pipe-Cutting Machine, of which the following is a specification.

My invention relates to a device for cutting section of pipe and particularly to a novel apparatus adapted to automatically sever short sections for use in manufacturing nipples.

One of the objects of my invention is to provide simple and effective apparatus adapted to economically provide short sections of pipe particularly such sections as are used in making nipples. The machines under consideration is so designed that relatively long sections of pipe of varying lengths may be placed in the machine and the said sections automatically severed into desired lengths. Provision is also made for readily varying the lengths of the sections and for accommodating pipes of different diameters.

The invention will be more readily understood by reference to the accompanying drawings, wherein, Fig. 1 is a side elevation of a device constructed in accordance with my invention;

Fig. 2 is a plan view thereof;

Fig. 3 is end view;

Fig. 4 is a sectional view on the line 4—4 of Fig. 6;

Fig. 5 is a view looking at the turret from the side opposite to that of Figs. 3 and 4;

Fig. 6 is a vertical sectional view on the line 6—6 of Fig. 5;

Fig. 7 is a fragmentary sectional view on the line 7—7 of Fig. 1;

Fig. 8 is a similar view on the line 8—8 of Fig. 2, and,

Fig. 9 is an enlarged sectional view on the line 9—9 of Fig. 2, and,

Fig. 10 is a face view of the cut-off cam.

In the drawings it will be seen that the invention includes suitable supports 10, within which are mounted large rods 11, spaced apart and which serve as ways on which some of the parts are reciprocable. Provided at intervals on the ways are cradles 12, each having a recess 13, adapted to be closed by a swinging jaw 14. When the piece of pipe, indicated at 15, is to be placed in position, the jaws 14 are manually lifted and the pipe rolled into the recess enclosed thereby. A supply of pipes, indicated at 16, may be retained in the cradle.

Means for automatically advancing the pipe by a step-by-step motion, are comprised by a cylinder 17, suitably mounted between the ways or rods 11, and firmly held in position by the end pieces 18, 19. Projecting axially through the end piece 18 is a relatively fixed piston 20, the stem 21 of which is threaded and is engaged by a hand-wheel 22. The wheel is held against relative longitudinal movement and therefore it will be seen that by rotating the wheel the piston may be reciprocated longitudinally as required. The rod 21 is hollow providing a conduit for fluid under pressure, a hose, indicated at 23, serving to connect the conduit to a pipe 24, shown in Fig. 1.

The movable piston 25 is rigid with a piston rod 26, the forward end of which is connected to a cross head 27, illustrated in detail in Fig. 6. It comprises a fixed lower jaw 28, and a vertically adjustable upper jaw 29. Both jaws carry pivoted clutch members 30, 31, having gripping points normally projecting into the plane of a pipe held between the jaws. Springs 32 act on the clutch members to force the points inwardly. The gripping points are so positioned that a piece of pipe may be moved to the left, as viewed in Fig. 6, but not in a reverse direction. The arrangement is such that the pipe, indicated at 15 in Fig. 6, may be moved to the left, as viewed in Fig. 6, and during engagement of the cutter with the pipe the cross head may be retracted, the gripping points riding on the surface of the pipe. The adjusting means are provided in order to accommodate pipes of different sizes. The movement of the piston to the right, as viewed in Fig. 9, is effected by fluid pressure admitted through the pipe connection 33, while movement of the piston to the left is effected by fluid pressure admitted through the pipe connection 23, the extent of reciprocation of the piston and consequently the extent of longitudinal movement of a pipe section at each reciprocation of the piston is controlled by adjusting the position of the relatively stationary piston 20. The cross head 27 is shown in dotted lines in Fig. 1 in a retracted position.

At the opposite end of the machine I provide a stop consisting of a cross member 34, secured to the rods 11, the cross member carrying a longitudinally adjustable projection 35, which may contain a shock-absorbing plunger 36, against which the pipe abuts.

The operating parts of the device are carried in the housing 37. The pipe cutter consists of a hardened metal disk 38 carried by a shaft 39 and rotated by a pinion 40 and gear 41. The gear is mounted on a shaft 42, which carries a belt pulley 43. The shafts 39, 42, are mounted in a sliding block 44, guided between ways 45, formed in the housing and having an upwardly projecting yoke 46. Hardened steel blocks 47, 48, are secured in the yoke and these are engaged by oppositely disposed cams 49, 50, rigid with a shaft 51, mounted in depending ears 52, forming a part of a slide-block 53, also guided between the ears 45, and firmly held in a desired adjusted position by means of the adjusting screw 54. The shaft 51 is rotated by means of gears 55, 56, and pinion 57, loosely mounted on a shaft 58, and having a clutch face adapted to be engaged by the clutch member 59. The clutch is operable in the usual manner to transmit the motion of a pulley 60, to the gears by means of an operating lever 61. The lever engages a slide-bar 62, which is held in either of its two positions by means of the spring-pressed ball 63, shown in Fig. 8.

The cam 50, which is the cut-off cam, is provided on its periphery with a flattened portion 50$^a$, which constitutes a dwell for the following purpose. After the cutting disk has been lowered to a point of engagement with the pipe, it has been found necessary to allow several revolutions of the disk in cutting engagement with the pipe in order to assure the beginning of rotation of the pipe. If the lowering action of the cutter is continuous the pipe will not start nor continue to rotate as is necessary in order to effect any cutting action. Therefore I provide the dwell in the cam which results in staying the descent of the cutter momentarily. This I consider to be an important feature.

Also secured to the shaft which carries the gear 56 is a cam 64, best shown in Fig. 3, the cam contacting in its angular movement an arm 65, of a valve 66, which controls the admission and discharge of fluid pressure through the pipes 24, 33, to the respective ends of the piston 25. The gear 55 which is mounted on the shaft with the cams 49, 50, for effecting the raising and lowering of the cutter, is the same diameter as the gear 56 with which it meshes. Thus for each complete rotation of the gear 56, the cutter is raised and lowered and the air is admitted successively to both ends of the air piston and the feeding device is caused to reciprocate once.

The operation of the device is as follows:

It being assumed that the ways and cradles are of sufficient length to accommodate suitable sections of pipe, a pipe is placed in the space 13, beneath the jaws 14, and power applied to the two pulleys 43, 60. Fluid pressure being admitted to the valve casing 66, the operation of the machine will cause the piston 25 to be projected outwardly, thus moving the pipe forward to the desired pre-determined extent. As soon as the pipe has been properly advanced, the cam 50, will act to depress the slide-block 44, carrying the cutter 38. This being revolved at a high rate of speed will cut into the metal of the pipe and the rotation of the cutter will also rotate the pipe which is supported beneath the cutter by the supporting rollers 67. As soon as the cutter has started its action on the pipe the motion of the cam arm 64 will change the position of the fluid pressure valve, air will be exhausted from one side of the piston 25, and air admitted on the opposite side. This will effect the return of the cross-head 27, the gripping jaws 30, 31, sliding on the surface of the pipe. As soon as the required cutting action is completed, the severed section will drop, the cutter will be lifted, due to the action of the cam 49, and a re-actuation of the fluid pressure valve due to a change in position of the cam 64 will cause the reversal of the piston movement and the advancement of another section of pipe.

Thus it will be seen that by properly proportioning the gears and cams the cutting action is automatic and requires no attention on the part of an operator except the insertion of a new section of pipe in proper position.

Obviously the construction is capable of such adjustment as necessary in order to accommodate different lengths and diameters of pipes and modifications may be made in the construction shown without departure from the spirit of my invention.

I claim:

1. In a pipe cutting machine, the combination of means for supporting a length of pipe, fluid pressure means adapted for reciprocation longitudinally of the pipe, means for gripping said pipe to effect movement thereof in one direction, and a cutting tool adapted for vertical reciprocation in syncronism with the longitudinal movement of the pipe for engaging the pipe to sever pre-determined lengths therefrom 2. In a pipe cutting device, the combination of a cradle for holding a length of pipe, a fluid pressure cylinder mounted adjacent to said cradle, a cross head movable by the action of a piston in said cylinder, clutch jaws carried by said cross head, a cutter adapted to act upon a pipe to sever sections therefrom, and means in said cylinder for controlling the effective stroke of the piston and thereby the length of pipe advanced at each stroke of the piston.

3. In a pipe cutting device, the combination of a base providing ways, a cross head reciprocable in said ways, clutch jaws carried by the cross head, means for holding a pipe in proper relation to said ways, a fluid pressure cylinder and piston for reciprocating said cross head, means in said cylinder for regulating the length of stroke of said piston, a cutter, and means for vertically reciprocating the cutter in synchronism with the reciprocation of said cross head.

4. In a device of the class described, the combination of means for holding a pipe, a cross head, single-acting clutch jaws in the cross head, said jaws operating to grip the pipe through movement in one direction of the cross head and to be ineffective for that purpose during movement in an opposite direction, a fluid pressure cylinder and piston for moving said cross head, and an adjustable head in said cylinder for regulating the length of stroke of said piston.

5. In a pipe cutting device, the combination of means for holding a pipe with capacity for rotation, a cutting disk, means for rotating the disk, a cam for effecting the lowering of the cutting disk into contact with the pipe, said cam being shaped to provide a dwell whereby the disk is brought into contact with a pipe and further movement of the disk toward the pipe is momentarily stayed.

6. In a pipe cutting device, the combination of means for holding a pipe with capacity for rotation on a longitudinal axis, a cutter-head adapted for reciprocation in a plane transverse to the pipe, a cutting disk carried by the head, a cam also carried by the head and adapted to effect movement of the disk relative to the head to bring the disk into and out of contact with a pipe, said cam being provided with a dwell immediately following the beginning of its active surface whereby the movement of the cutting disk toward the center of the pipe is momentarily interrupted.

Signed at Lake Bluff, Illinois, this 24th day of October, 1921.

THOMAS RANKIN.